US012634572B2

(12) United States Patent
Aimi

(10) Patent No.: US 12,634,572 B2
(45) Date of Patent: May 19, 2026

(54) INFORMATION PROCESSING APPARATUS, CONTROL METHOD FOR THE SAME, AND STORAGE MEDIUM

(71) Applicant: CANON KABUSHIKI KAISHA, Tokyo (JP)

(72) Inventor: Masahiro Aimi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/596,480

(22) Filed: Mar. 5, 2024

(65) Prior Publication Data

US 2024/0323512 A1 Sep. 26, 2024

(30) Foreign Application Priority Data

Mar. 22, 2023 (JP) ................................. 2023-045120

(51) Int. Cl.
*H04N 23/611* (2023.01)
*H04N 23/67* (2023.01)

(52) U.S. Cl.
CPC ......... *H04N 23/611* (2023.01); *H04N 23/672* (2023.01)

(58) Field of Classification Search
CPC ..... H04N 23/611; H04N 23/672; H04N 23/61
See application file for complete search history.

(56) References Cited

U.S. PATENT DOCUMENTS

| 2014/0218283 A1* | 8/2014 | Choi | H04N 23/611 |
| | | | 345/156 |
| 2019/0138110 A1* | 5/2019 | Choi | H04N 23/611 |
| 2020/0228692 A1* | 7/2020 | Wakamatsu | H04N 23/695 |
| 2023/0110484 A1* | 4/2023 | Ahn | H04N 23/635 |
| | | | 455/411 |

FOREIGN PATENT DOCUMENTS

JP 2001111881 A 4/2001

* cited by examiner

*Primary Examiner* — Gevell V Selby
(74) *Attorney, Agent, or Firm* — Canon U.S.A., Inc. IP Division

(57) ABSTRACT

An information processing apparatus which detects information about a human, including detecting a first gesture. The first gesture indicates at least one of a direction in which an object is present, a position at which the object is present, and an area in which the object is present. In response to detection of the first gesture, information about the object is acquired and a main subject is determined in accordance with a result of acquisition of the information or in accordance with a result of detection of the information about the human.

17 Claims, 7 Drawing Sheets

FIG. 1

INFORMATION PROCESSING APPARATUS, CONTROL METHOD FOR THE SAME, AND STORAGE MEDIUM

BACKGROUND

Field of the Disclosure

The present disclosure relates to an information processing apparatus, a control method for the same, and a storage medium, and in particular relates to a technology for supporting selection of the main subject.

Description of the Related Art

In recent years, an increasing number of people have taken a moving image in which they introduce a commercial product and distributed the taken moving image.

In taking a moving image for introducing a commercial product, it is preferred to control changing a main subject at an intended timing in order to emphasize the target product.

However, in distributing a moving image for introducing a product on an individual basis, a performer who introduces the product on screen, a videographer who takes a moving image, and a distributor who distributes the taken moving image in real time are a same person in many cases. Accordingly, it is difficult to change a setting of an imaging apparatus during distribution of the moving image.

Japanese Patent Application Laid-Open No. 2001-111881 discusses that if the subject's motion of waving a hand or the like and a predetermined motion stored in advance coincide with each other, an imaging apparatus executes a predetermined process corresponding to the detected predetermined motion, thereby to enable the remote manipulation of the imaging apparatus. More specifically, Japanese Patent Application Laid-Open No. 2001-111881 discusses that waving a hand toward a personal computer or mobile phone equipped with a digital camera enables the personal computer or the like to activate the shutter, switch between zoom-in and zoom-out, transmit e-mails, or accomplish mouse movement on the personal computer.

However, it is not considered that the main subject is directly designated within a shooting angle.

SUMMARY

The present disclosure provides an information processing apparatus that enables optimum setting of the main subject during image shooting, a control method for the same, and a storage medium.

According to an aspect of the present disclosure, an information processing apparatus includes at least one processor causing the information processing apparatus to act as a detection unit configured to detect information about a human, a first detection unit configured to detect that a first gesture is made, the first gesture indicating at least any of a direction in which an object is present, a position at which the object is present, and an area in which the object is present, an acquisition unit configured to acquire information about the object in response to detection of the first gesture, and a determination unit configured to determine a main subject in accordance with a result of acquisition of the information about the object by the acquisition unit or a result of detection of the information about the human by the detection unit.

Further features of the present disclosure will become apparent from the following description of embodiments with reference to the attached drawings.

BRIEF DESCRIPTION OF THE DRAWINGS

FIG. 1 is a diagram illustrating a hardware configuration of an information processing apparatus in a first embodiment.

DESCRIPTION OF THE EMBODIMENTS

Figure 2:
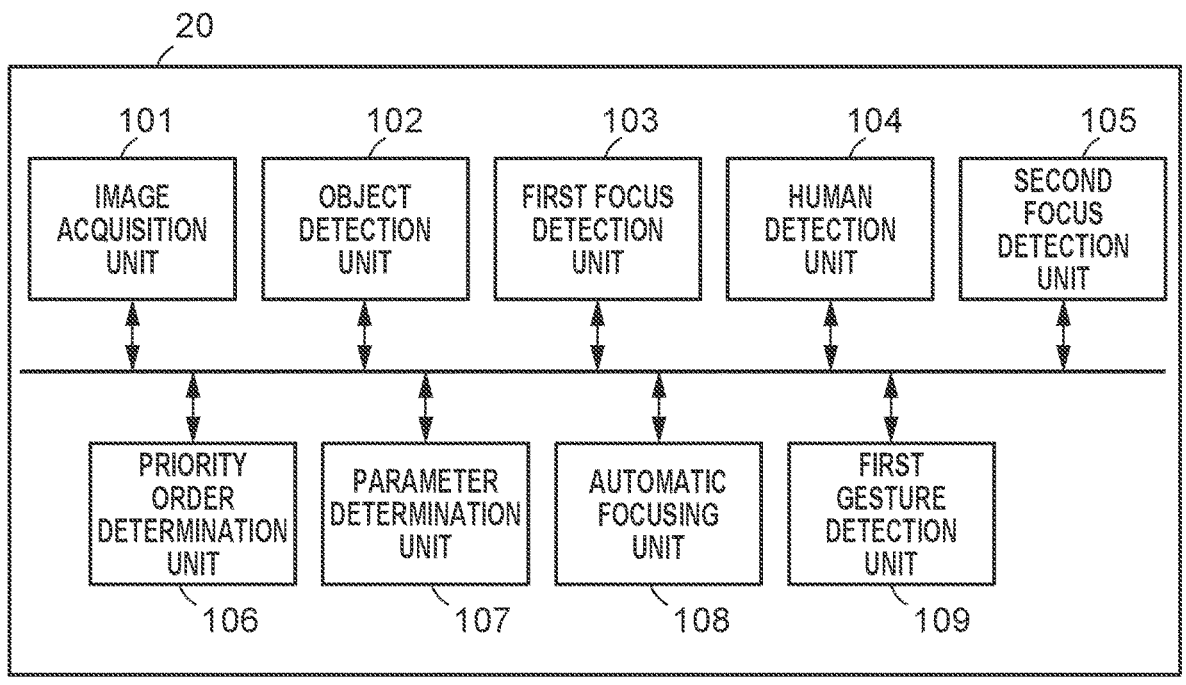
FIG. 2 is a block diagram illustrating a functional configuration of an electric circuit in the first embodiment.

Preferred embodiments of the present disclosure will be described in detail with reference to the attached drawings. First, a first embodiment will be described.

Configuration of Information Processing Apparatus

Figure 1:
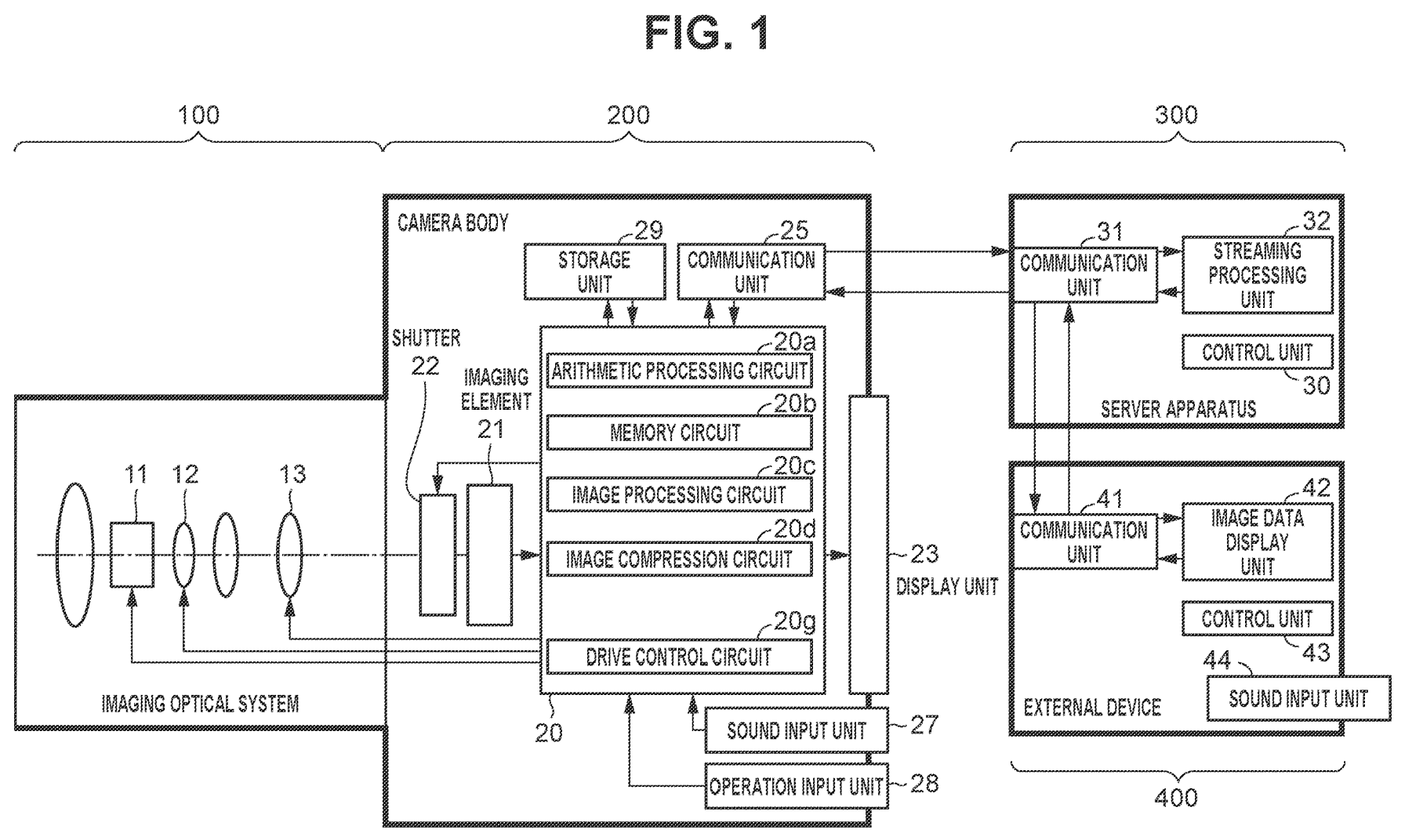

FIG. 1 is a diagram illustrating a hardware configuration of a lens-interchangeable camera (hereinafter, simply called camera) that is an example of an information processing apparatus to which the present disclosure is applicable. The camera includes a lens part 100 and a camera body 200. When the lens part 100 is attached to the camera body 200, a lens control unit that performs centralized control of the operations of the lens part 100 and a camera control unit that performs centralized control of the operations of the entire camera become communicable to each other via a communication unit. The camera body 200 is connectable to a server apparatus 300 on a network via wireless communication or wired communication.

The server apparatus 300 is a moving image distribution server that has a moving image distribution function, for example.

The lens part 100 is includes in an imaging optical system. The lens part 100 includes a diaphragm 11, a camera-shake correction lens group 12, a focus lens/zoom lens group 13, and others, and can guide an optical image of the subject to the camera body 200.

The camera body 200 includes an imaging element 21 that subjects an optical image formed by the lens part 100 to photoelectric conversion to generate an image signal. In the imaging element 21, each pixel holds a plurality of photo diodes (photoelectric conversion units) for one micro lens in order to perform focus detection by an image plane phase difference method. In the present embodiment, each pixel includes two photo diodes aligned in two columns and one row. In each pixel configured as described above, light beams having passed through different pupil regions in the imaging optical system of the lens part 100 are separated by a micro lens and an image is formed on the two photo diodes. A signal obtained by adding up signals from the two photo diodes (A+B signal) is used as an image signal for recording, and two signals (A signal and B signal) read from the individual photo diodes are used as focus detection signals. Using the thus-obtained focus detection signals, it is possible to perform focus detection by the imaging plane phase difference method (imaging plane phase difference autofocus (AF)).

The camera body 200 includes a mechanical shutter 22 that adjusts an exposure time during which the imaging element 21 is to be exposed. The camera body 200 controls the diaphragm 11 and the lens groups 12 and 13 of the lens part 100 based on the setting values of a plurality of setting items, and also controls the drive timing of the imaging element 21 and the shutter speed of the mechanical shutter 22 to perform image shooting at correct exposure. The camera body 200 includes a rear surface display unit 23 that can display the image taken by the imaging element 21, various setting values of the apparatus at the time of image shooting, and others. The rear surface display unit 23 includes a display device such as a liquid crystal panel or an organic EL, and is provided on the rear part of the camera body 200 on the side opposite to the lens part 100.

The mechanical shutter 22 is not necessary if the imaging element 21 includes an electronic shutter function of adjusting the exposure time by controlling the signal accumulation time and the signal read time. If the imaging element 21 includes the mechanical shutter 22 and the electronic shutter function, the mechanical shutter 22 is placed in the fully open state when the exposure time is adjusted with the electronic shutter.

The camera body 200 includes an electric circuit 20. The electric circuit 20 includes an arithmetic processing circuit 20a, a memory circuit 20b, an image processing circuit 20c, an image compression circuit 20d, a drive control circuit 20g, and others.

The arithmetic processing circuit 20a includes a processor such as a central processing unit (CPU) or a micro processing unit (MPU) that performs various types of arithmetic processing for controlling operations of the lens part 100 and the camera body 200. The arithmetic processing circuit 20a controls the components of the lens part 100 and camera body 200 by executing programs stored in a storage unit 29. The programs here include a program for performing a control process in the present embodiment. As an example, the arithmetic processing circuit 20a generates phase difference AF signals (a pair of image signals) from focus detection signals formed by light beams passing through different pupil regions in the imaging optical system, and detects a defocus amount DEF based on an amount of a gap between the pair of image signals. Based on the calculated defocus amount DEF, the arithmetic processing circuit 20a calculates a distance z from the imaging element 21 to the subject. The distance z can be calculated by the following mathematical formulae (1) and (2):

$$dist = 1/\big(1/(dist\_d + DEF) - 1/f\big) \qquad (1)$$

$$z = length - dist \qquad (2)$$

In the formulae, dist indicates a distance from the in-focus position to the subject, dist_d indicates a distance from the image-side principal point in the lens part 100 to the imaging element 21 that constitutes a sensor surface, f indicates a focal length, length indicates a distance from the imaging element 21 to the in-focus position. The in-focus position is equivalent to the focused position.

The distance "length" from the imaging element 21 to the in-focus position can be measured by a laser ranging means not illustrated, for example. The distance to the in-focus position corresponding to the lens position at the time of image shooting can be estimated with a data table indicating the relationship between the lens position at the time of image shooting and the in-focus position. The data table indicating the relationship between the lens position and the in-focus position reduces the time and effort in calculating the distance from the imaging element 21 to the in-focus position.

The example of calculating the distance z from the signals output from the imaging element 21 has been described, but the present disclosure is not limited to this example. For example, the distance z can also be calculated by a stereo camera. The distance z may be calculated by an external apparatus outside of the camera body 200, and the distance z calculated by the external apparatus may be acquired by the camera body 200. The information about the distance to the subject may be acquired by an apparatus such as a laser intensity direction and ranging (LiDAR), not by calculating from the images.

The information about the distance between the camera body 200 and the subject has been described, taking the distance from the imaging element 21 as an example. However, the present disclosure is not limited to this example, and the distance from an arbitrary position such as the front end of the lens part 100 may be used.

The memory circuit 20b is used as a work memory in which the program read from the storage unit 29 is developed, a buffer memory that temporarily holds image signals and focus detection signals captured by the imaging element 21, and as an image display memory for the rear surface display unit 23.

The image processing circuit 20c performs various types of image processing on the image signal generated by the imaging element 21. The image data output from the image processing circuit 20c may be output to the rear surface display unit 23, or may be compressed in a predetermined data format by the image compression circuit 20d and output to and recorded in the storage unit 29.

The image compression circuit 20d subjects the image data output from the image processing circuit 20c to compression coding in a predetermined data format to generate an image file.

The drive control circuit 20g controls a drive circuit or an actuator not illustrated based on the results of the arithmetic processing by the arithmetic processing circuit 20a to control the diaphragm 11 and the lens groups 12 and 13 of the lens part 100 and the mechanical shutter 22 of the camera body 200.

The camera body 200 includes an operation input unit 28 such as switches, buttons, or a touch panel for accepting user operations. In the present embodiment, the operation input unit 28 includes a shutter switch for instructing an image shooting preparation or an image shooting start. When the shutter switch is lightly pressed to a first stage, that is, the shutter switch is half-pressed, operations of an autofocus process, an automatic exposure process, and an automatic white balance process are started. Further, when the shutter switch is further deeply pressed to the second stage, that is, is fully-pressed, operations of an image shooting process are started. The image shooting process here is a series of operations of activating the electronic shutter function of the mechanical shutter 22 or the imaging element 21, reading signals from the imaging element 21, and writing the image data into the storage unit 29. As the operation input unit 28, there may be provided a switch by which the user can enable or disable a moving image distribution function by the server apparatus 300 to be described below.

The camera body 200 includes a communication unit 25. The communication unit 25 includes an interface circuit for communicably connecting the camera body 200 to an external device via a network such as the Internet. The camera body 200 can transmit and receive data to and from the external device connected to the wired or wireless network. For example, the camera body 200 can control the communication unit 25 to output the image data processed by the image processing circuit 20c to the server apparatus 300 on the network.

The camera body 200 includes a sound input unit 27. The sound input unit 27 includes a microphone or the like, converts the input sound into an electric signal, and outputs the electric signal as sound data to the electric circuit 20. The audio data output to the electric circuit 20 is added to the image data, and is output to and recorded in the storage unit 29. In the present embodiment, for example, the sound input unit 27 can perform sound acquisition by receiving an input of a sound generated by the user and outputting sound data to the electric circuit 20.

The sound input unit 27 may be built in the camera body 200 or may be connected to an external terminal not illustrated.

The camera body 200 includes the recording unit 29 such as a memory card or a hard disk. The storage unit 29 stores programs to be executed by the arithmetic processing circuit 20a. The storage unit 29 records image files compressed in a predetermined format by the image compression circuit 20d, and image files already recorded are read from the storage unit 29. The storage unit 29 may be detachably attached to the camera body 200 or may be built in the camera body 200.

The configuration and functions of the moving image distribution server 300 will be described. The moving image distribution server 300 includes a control unit 30, a communication unit 31, and a streaming processing unit 32.

The control unit 30 includes a processor such as a CPU or an MPU that performs various types of arithmetic processing for controlling the operations of the moving image distribution server 300. The control unit 30 controls the components of the moving image distribution server 300 by executing predetermined programs. The programs here include a program for performing the moving image distribution process in the present embodiment. The communication unit 31 can connect to the communication unit 25 of the camera body 200 via a network to transmit and receive data to and from the camera body 200 and an external device 400. The communication unit 31 outputs the image data transmitted from the communication unit 25 of the camera body 200 to the streaming processing unit 32. The streaming processing unit 32 produces a moving image for distribution based on the image data transmitted from the communication unit 25, and transmits the same to the communication unit 31. The image data having undergone the streaming process is transmitted to viewers' external device 400 in FIG. 1 via the communication unit 31. A communication unit 41 is connected to the communication unit 31 of the moving image distribution server 300 via a network and can transmit and receive data. The external device 400 includes an image data display unit 42 configured to display a distributed moving image (image data), a control unit 43 configured to control the entire external device, and a sound input unit 44 configured to detect a specific sound in a sound. The sound detected by the sound input unit 44 is input to a sound detection unit 412 included in the electric circuit 20 of the camera body 200 via the moving image distribution server 300.

Functional Configuration of Electric Circuit 20 in a First Embodiment

FIG. 2 is a block diagram conceptually illustrating a functional configuration of the electric circuit 20 in the first embodiment. The electric circuit 20 includes an image acquisition unit 101, an object detection unit 102, a first focus detection unit 103, a human detection unit 104, a second focus detection unit 105, a priority order determination unit 106, a parameter determination unit 107, an automatic focusing unit 108, and a first gesture detection unit 109.

These processing units are stored as programs in the memory circuit 20b, for example, and are implemented by the arithmetic processing circuit 20a executing these programs.

The image acquisition unit 101 sequentially acquires images from the imaging element 21 in real time.

The object detection unit 102 detects an object from the images acquired by the image acquisition unit 101. The object detected here is a product introduced or the like. The object detection unit 102 holds in advance features of objects such as shapes, colors, and information. Based on the information, the object detection unit 102 detects the object from the images. In a case where a plurality of objects is present in the image, the object detection unit 102 may detect the plurality of objects.

The first focus detection unit 103 generates phase difference AF signals (a pair of image signals) from focus detection signals in a region corresponding to the object from the results of acquisition of the object information by the object detection unit 102, and detects a defocus amount DEF based on an amount of a gap between the pair of image signals. Based on the calculated defocus amount DEF, the first focus detection unit 103 calculates the distance z from the imaging element 21 to the object.

The human detection unit 104 detects a human from the images acquired by the image acquisition unit 101. The human detection unit 104 holds in advance shape information about humans' faces and bodies (human bodies, faces, pupils, heads, trunks, and others), color information, and the like, and detects a human from the images based on the held information.

The second focus detection unit 105 generates phase difference AF signals (a pair of image signals) from defocus detection signals in the region corresponding to the human from the results of detection of the human information by the human detection unit 104, and detects a defocus amount DEF based on an amount of a gap between the pair of image signals. Based on the calculated defocus amount DEF, the second focus detection unit 105 calculates the distance z from the imaging element 21 to the object.

The priority order determination unit 106 determines the target to be focused from the human and the object by focus control. Which target to be prioritized will be described below.

The parameter determination unit 107 determines a focus parameter for bringing the imaging unit into focus on the target by using the focus detection information calculated by the first focus detection unit 103 and the second focus detection unit 105. The focus parameter is an aperture value or the like for adjusting the in-focus position and the depth of field of the subject. The focus position can be expressed by the distance between the lens and the imaging element, focal length, or the like, for example, in accordance with the configuration for focusing by the image acquisition unit 101.

The automatic focusing unit 108 sets the focus parameter determined by the parameter determination unit 107 to the drive control circuit 20g for focus adjustment.

The first gesture detection unit 109 detects a specific gesture from the images acquired by the image acquisition unit 101. The gesture detected here is a gesture of pointing a finger in a specific direction. The first gesture detection unit 109 also determines whether the object detected by the object detection unit 102 is present in the direction in which a finger points. The gesture detected may be, besides a gesture of pointing a finger in a specific direction, a gesture of showing a position of a target or a gesture of showing an area in which an object is present (first detection).

Focus Parameter Setting Process in a First Embodiment

A focus parameter setting process in the first embodiment will be described with reference to FIG. 3.

Figure 3:
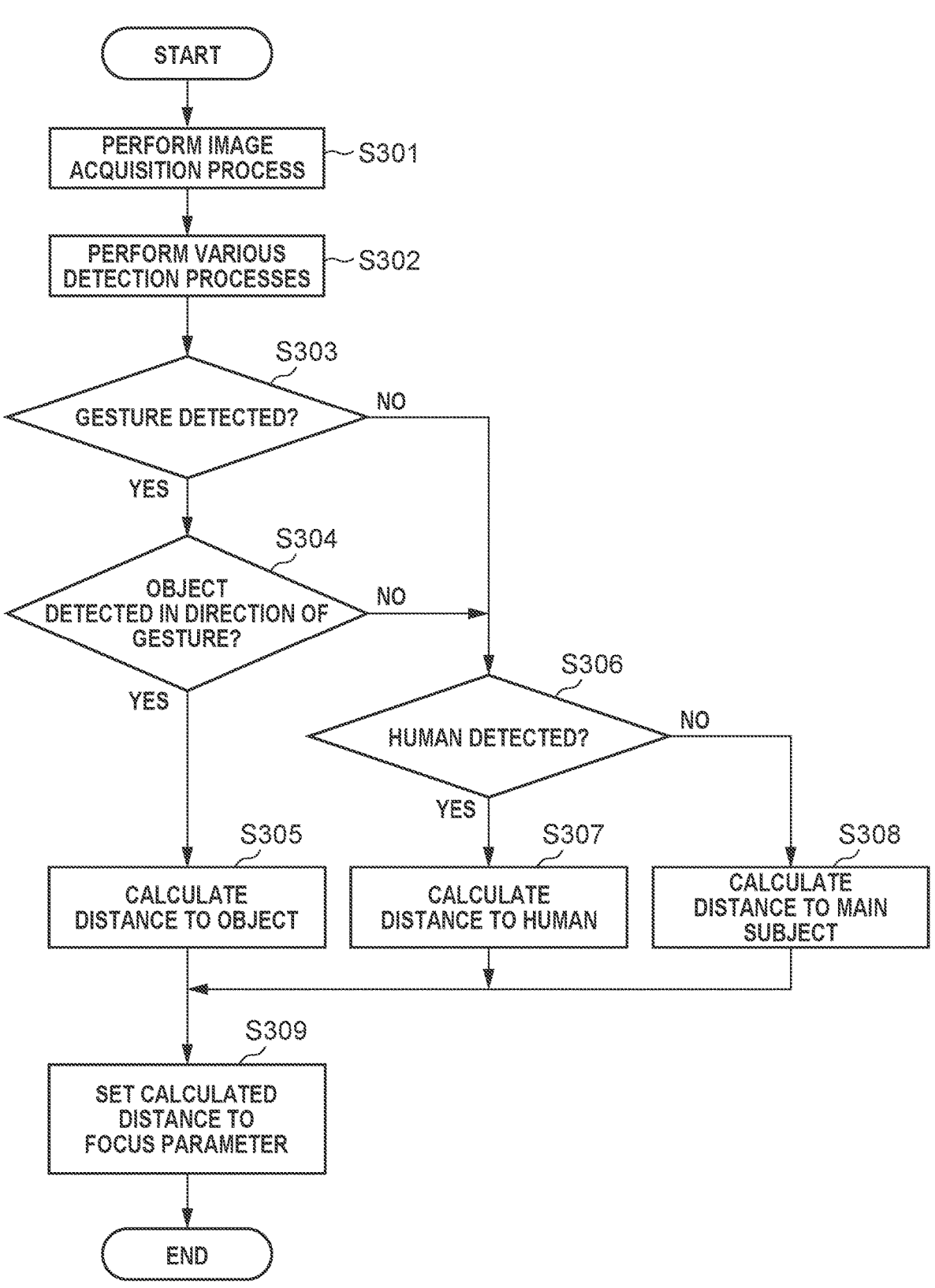
FIG. 3 is a flowchart illustrating a process executed by the electric circuit in the first embodiment.

FIG. 3 is a flowchart illustrating an operation example of the electric circuit 20 in the first embodiment.

In the following description, the steps are executed by the arithmetic processing circuit 20a that is a part of the electric circuit 20.

When a product introduction mode is started by an input operation on the operation input unit 28, in step S301, the image acquisition unit 101 of the electric circuit 20 acquires image signals in sequence from the imaging element 21.

In step S302, the object detection unit 102, the human detection unit 104, and the first gesture detection unit 109 start detection of an object, a human body, and a gesture from the acquired image signals. At this time, the parameter determination unit 107 raises the aperture value such that the various subjects can be easily detected from the image signals, increases the depth of field of the subject such that the focus can be achieved in a wide range. Step S302 may be executed at each image acquisition or may be executed in a first cycle.

In step S303, the first gesture detection unit 109 determines whether a gesture has been detected in the images. In a case where a gesture has been detected (YES in step S303), the process proceeds to step S304, and in a case where no gesture has been detected (NO in step S303), the process proceeds to step S306.

In step S304, the object detection unit 102 determines whether an object has been detected in the images in the direction of the gesture detected by the first gesture detection unit 109. In a case where an object has been detected (YES in step S304), the process proceeds to step S305, and in a case where no object has been detected (NO in step S304), the process proceeds to step S306.

In step S305, the first focus detection unit 103 calculates the distance between the object detected in step S304 and the imaging element 21.

In a case where there is a plurality of objects, the priority order determination unit 106 determines the object from which the distance to the imaging element 21 is to be calculated, in accordance with the contents of the gesture detected in step S304. For example, if the detected gesture is a gesture indicating the priority of the nearest object, the priority order determination unit 106 determines that the object located nearest in the direction shown by the gesture is to be prioritized over the other objects.

In step S306, the human detection unit 104 determines whether a human has been detected from the images. In a case where a human has been detected (YES in step S306), the process proceeds to step S307, and in a case where no human has been detected (NO in step S306), the process proceeds to step S308.

In step S307, the first focus detection unit 103 calculates the distance between the human detected in step S306 and the imaging element 21 based on the image information related to the human.

In step S308, the arithmetic processing circuit 20a sets a predetermined subject as the main subject. Based on the image information related to the main subject, the arithmetic processing circuit 20a calculates the distance between the main subject and the imaging element 21. The predetermined subject is a subject in or around the center of the image, for example. Alternatively, in a case where an object has been detected in step S302, the object may be set as the main subject.

In step S309, the parameter determination unit 107 determines a focus parameter for focusing using the distance calculated in any of the series of steps. The automatic focusing unit 108 sets the determined focus parameter to the drive control circuit 20g. The series of steps S301 to S309 may be repeatedly executed.

Performing the process in this manner makes it possible to focus on a human if no gesture has been detected, and to focus on a product if a gesture has been detected. Accordingly, the distributer can freely change the subject to be focused at an intended timing.

In the present embodiment, the first gesture detection unit 109 detects a specific gesture from the images. Alternatively, the first gesture detection unit 109 may detect a gesture using a millimeter wave sensor or the like instead of images. If the apparatus is a compound eye camera or the like, the various detection processes may be performed using another camera unit. In the present embodiment, after the main subject is determined, the parameter determination unit 107 determines the focus parameter for focusing in order to perform-ing automatic focusing. Alternatively, the parameter deter-mination unit 107 may determine an exposure time parameter for automatic exposure.

The parameter determination unit 107 may determine a parameter for automatic white balance. The parameter deter-mination unit 107 may determine a parameter for tracking. This implements functions of automatic focusing, automatic white balance, automatic exposure, and tracking.

Figure 4:
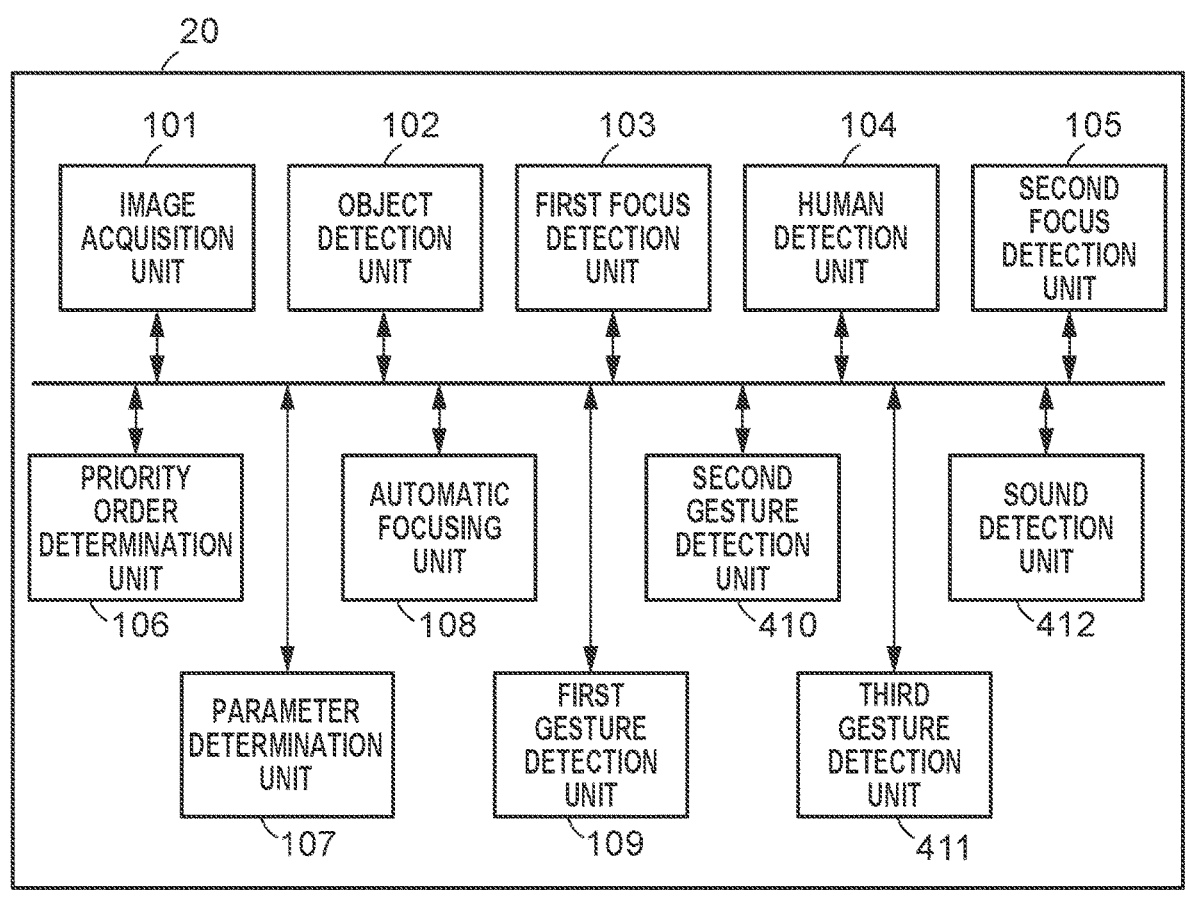
FIG. 4 is a block diagram illustrating a functional configuration of an electric circuit in a second embodiment.

A second embodiment of the present disclosure will be described. However, a hardware configuration of the appa-ratus of the present embodiment is similar to that of the first embodiment illustrated in FIG. 1, and thus description of the hardware configuration will be omitted. FIG. 4 is a diagram conceptually illustrating a functional configuration of an electric circuit 20 in the second embodiment. Components 101 to 109 illustrated in FIG. 4 are similar to the components 101 to 109 illustrated in FIG. 2 and thus description of the components 101 to 109 will be omitted.

A second gesture detection unit 410 and a third gesture detection unit 411 detect specific gestures from the images acquired by an image acquisition unit 101. A first gesture detection unit 109 detects a gesture of pointing a finger in a specific direction, and the second gesture detection unit 410 detects a gesture of bending a finger (a second detection). The third gesture detection unit 411 detects a gesture of pointing a plurality of fingers such as two fingers or a gesture of waving a hand (a third detection).

A sound detection unit 412 receives sounds input by a sound input unit 27 or sounds acquired from a moving image distribution destination (the external device 400) via a server apparatus 300, and detects a specific sound among these sounds.

Focus Parameter Setting Process in a Second Embodiment

Figure 5:
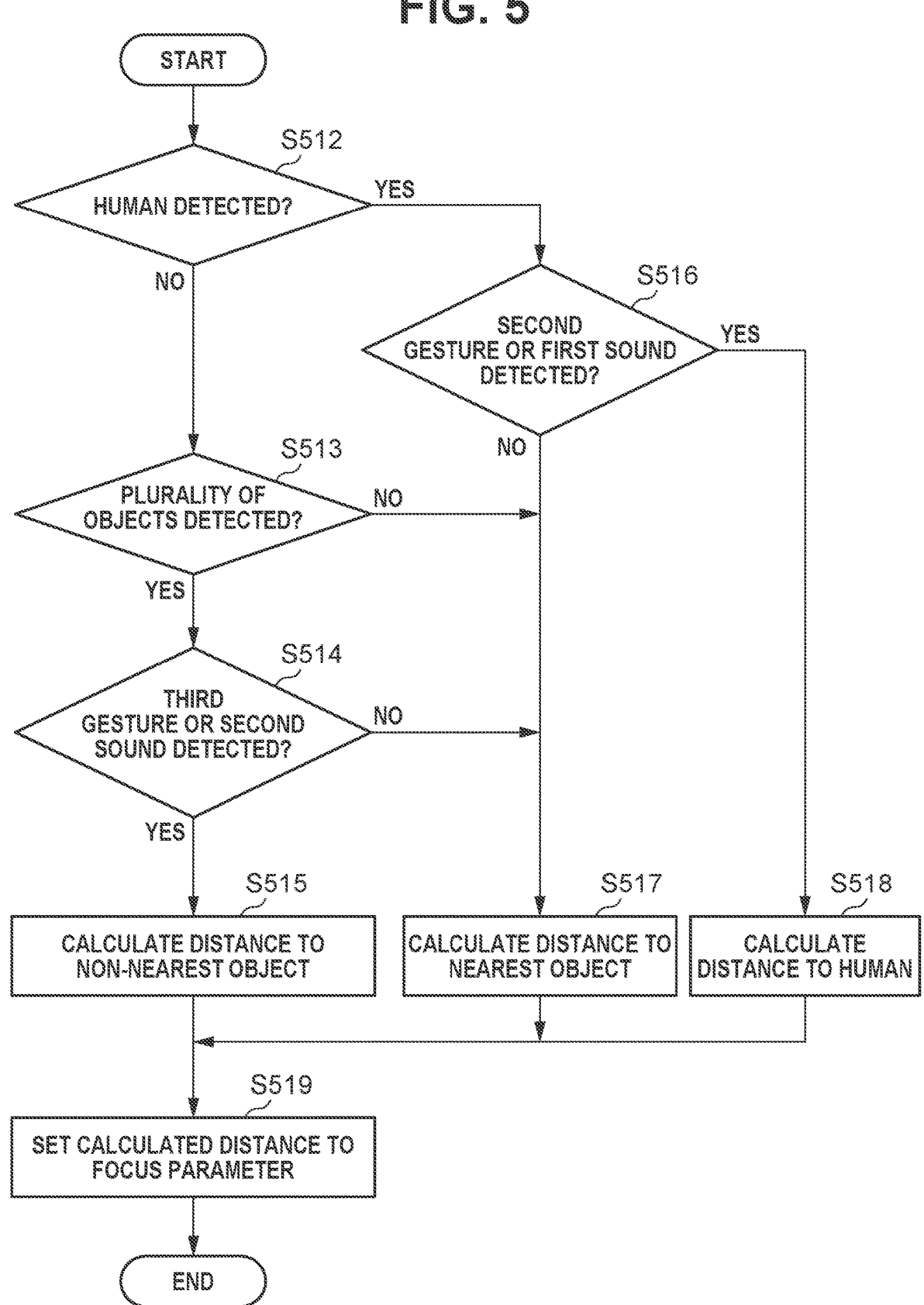
FIG. 5 is a flowchart illustrating a process executed by the electric circuit in the second embodiment.

A focus parameter setting process in the second embodiment will be described with reference to FIG. 5. In step S512, it is determined whether a human detection unit 404 has detected a human from the images. At this time, a parameter determination unit 107 raises the aperture value such that various subjects can be easily detected from the images, increases the depth of field of the subject so that the focus is achieved in a wide range. In a case where a human has been detected (YES in step S512), the process proceeds to step S516, and in a case where no human has been detected (NO in step S512), the process proceeds to step S513.

In step S513, it is determined whether a plurality of objects has been detected in the images in the direction of the gesture detected by the first gesture detection unit 109. In a case where a plurality of objects has been detected (YES in step S513), the process proceeds to step S514, and in a case where a plurality of objects has not been detected (NO in step S513), the process proceeds to step S517.

In step S514, it is determined whether a third gesture has been detected by the third gesture detection unit 411 in the images or whether a second sound has been detected by the sound detection unit 412. The third gesture is an action of pointing a plurality of fingers at an object or waving a hand. The second sound is a sound indicating switching between objects to be focused. In a case where the third gesture or the second sound has been detected (YES in step S514), the process proceeds to step S515, and in a case where neither the third gesture nor the second sound has been detected (NO in step S514), the process proceeds to step S517.

In step S515, a priority order determination unit 106 determines an object from which the distance to an imaging element 21 is to be calculated, in accordance with the contents of the third gesture or the second sound. The priority order determination unit 106 calculates the distance to the second nearest object located in the direction in which the fingers point. Repeatedly performing step S515 enables the priority order determination unit 106 to change the object to be prioritized such as a change to the third nearest object or a change to the fourth nearest object.

In step S516, it is determined whether a second gesture has been detected by the second gesture detection unit 410 in the images or whether a first sound has been detected by the sound detection unit 412. The second gesture is a gesture of pointing a finger in the direction of a human or a gesture of bending a finger. The first sound is a sound indicating the end of focusing in the direction of a human or the end of focusing on an object. In a case where the second gesture has been detected (YES in step S516), the process proceeds to step S518, and in a case where the second gesture has not been detected (NO in step S516), the process proceeds to step S517.

In step S517, the priority order determination unit 106 determines an object from which the distance to the imaging element 21 is to be calculated, in accordance with the contents of the first gesture. The priority order determination unit 106 determines the nearest object located in the direction in which a finger points by the gesture, to be prioritized over the other objects. In step S518, the second focus detection unit 105 calculates the distance between the human detected in step S512 and the imaging element 21 based on the image information related to the human. In step S519, the parameter determination unit 107 determines a focus parameter for focusing using the distance calculated in any of the series of steps. For the case where the first gesture detection unit 109 has detected a plurality of gestures competing with each other, the user selects one of three modes to be described below in advance by an input operation on the operation input unit 28 to determine the gesture to be prioritized. In mode 1, the earlier detected gesture is prioritized. In mode 2, the gesture made by a person closer to the apparatus is prioritized. In mode 3, the gesture made by a person located in the direction in which the sound has been detected by the sound detection unit 412 is prioritized.

Performing the process in this manner enables the distributor to, after the introduction of a product by a gesture or a sound, return the focus to the distributor at a desired timing. If a plurality of gestures competes with each other, it is possible to determine which gesture is to be prioritized.

Figure 6:
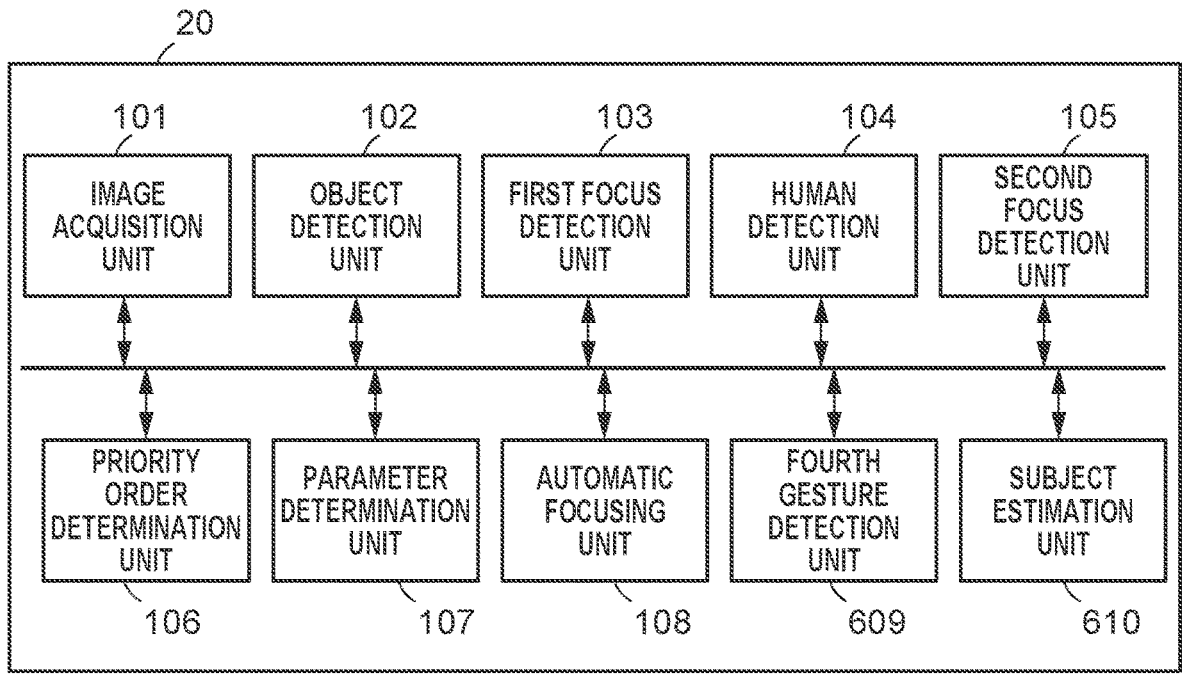
FIG. 6 is a block diagram illustrating a functional configuration of an electric circuit in a third embodiment.

A third embodiment of the present disclosure will be described. However, a hardware configuration of an apparatus of the present embodiment is similar to that of the first embodiment illustrated in FIG. 1, and thus description of the hardware configuration will be omitted. FIG. 6 is a diagram conceptually illustrating a functional configuration of an electric circuit 20 in the third embodiment. Components 101 to 108 illustrated in FIG. 6 are similar to components 101 to 108 illustrated in FIG. 2 and thus description of the components 101 to 108 will be omitted.

A subject estimation unit 610 analyzes subjects located in the direction of the gesture detected by a fourth gesture detection unit 609 from the images acquired by an image acquisition unit 101, and estimates the subject to be focused. For example, if the subject is the sky, the subject estimation unit 610 estimates the subject to be focused as an object flying in the sky such as a bird or an airplane. If the subject is a railroad, the subject estimation unit 610 estimates the subject to be focused as a train.

Figure 7:
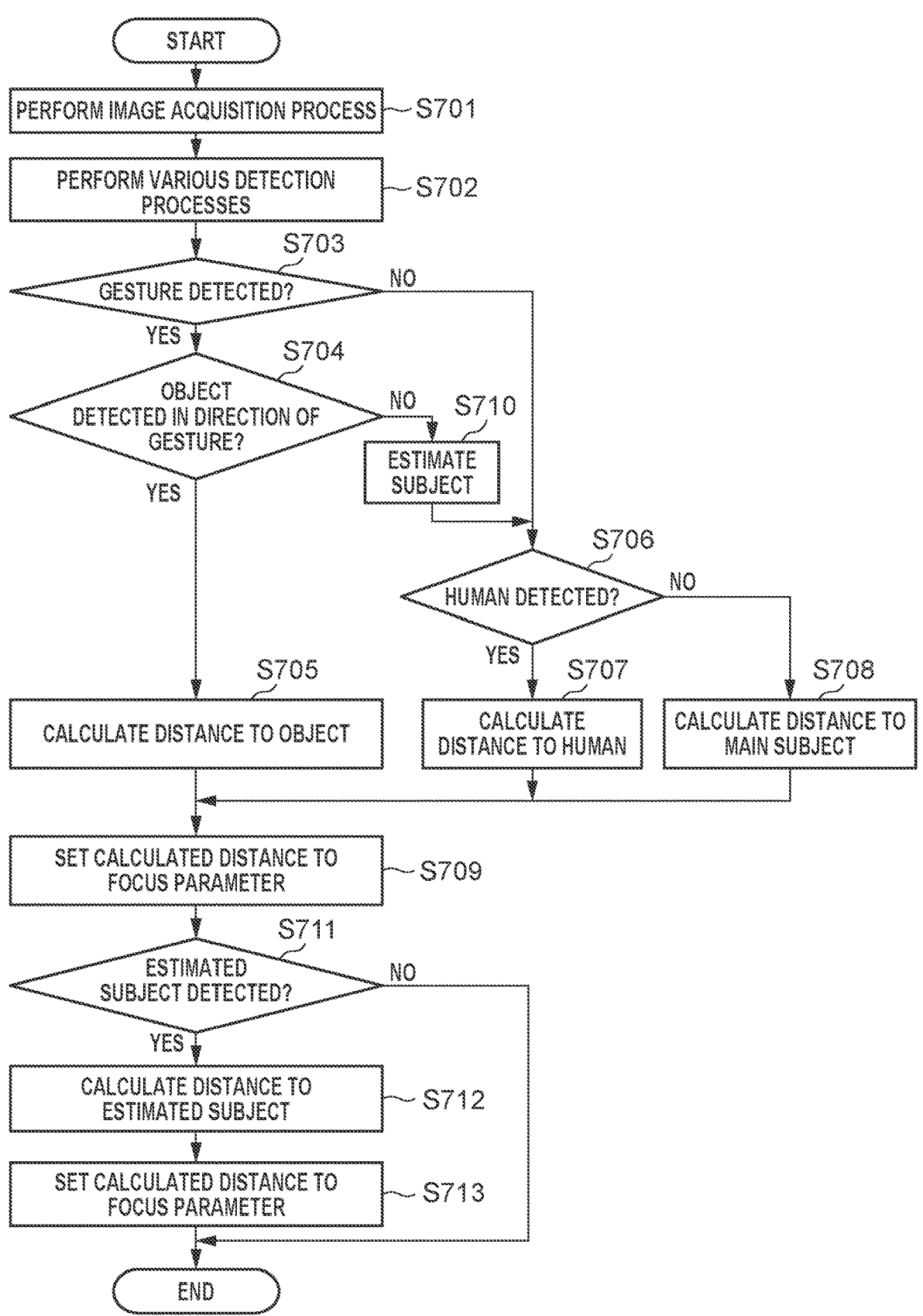
FIG. 7 is a flowchart illustrating a process executed by the electric circuit in the third embodiment.

A focus parameter setting process in the third embodiment will be described with reference to FIG. 7. Steps S701 to S709 in an imaging control process in the third embodiment illustrated in FIG. 7 correspond to steps S301 to S309 illustrated in FIG. 3, and thus description of the steps S701 to S709 will be omitted and only the steps different from those in FIG. 3 will be described.

In step S704, it is determined whether an object has been detected in the direction of the gesture. In a case where no object has been detected (NO in step S704), the process proceeds to step S710. In step S710, the subject estimation unit 610 estimates the subject to be focused. In step S709, focus is placed on some subject once, and then the process proceeds to step S711.

In step S711, it is determined whether the subject estimated in step S710 is present in the images. In a case where the estimated subject is present in the images (YES in step S711), the process proceeds to step S712, and in a case where the estimated subject is not present in the images (NO in step S711), the process is ended. In step S712, a first focus detection unit 103 calculates the distance to an imaging element 21 based on the image information related to the estimated subject detected in step S712. In step S713, a parameter determination unit 107 determines a focus parameter for focusing using the distance calculated in step S712. An automatic focusing unit 108 sets the determined focus parameter to a drive control circuit 20g.

Performing the process in this manner makes it possible to, even if the target on which the distributor wishes to place a focus comes later, take an image with focus on the appropriate subject.

In the embodiments described above, the present disclosure is applied to a lens-interchangeable camera as an example. However, the present disclosure is not limited to this example, and is appliable to any apparatus that can perform control related to information processing. That is, the present disclosure is applicable to mobile phone units, personal computers (PCs), tablet PCs, game machines, and others.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-045120, filed Mar. 22, 2023, which is hereby incorporated by reference herein in its entirety.

What is claimed is:

1. An information processing apparatus comprising at least one processor causing the information processing apparatus to act as:

a detection unit configured to detect information about a human;

a first detection unit configured to detect that a first gesture is made, the first gesture indicating at least any of a direction in which an object is present, a position at which the object is present, and an area in which the object is present;

an acquisition unit configured to acquire information about the object in response to detection of the first gesture; and a determination unit configured to determine a main subject in accordance with a result of acquisition of the information about the object by the acquisition unit or a result of detection of the information about the human by the detection unit, wherein in a case where the first gesture is not detected by the first detection unit, the determination unit determines the main subject based on the information about the human detected by the detection unit.

2. The information processing apparatus according to claim 1, wherein in a case where the first gesture is detected by the first detection unit, the determination unit determines the main subject based on the result of acquisition of the information about the object by the acquisition unit.

3. The information processing apparatus according to claim 2, wherein in a case where the first gesture is no longer detected after the main subject is detected based on the information about the object, the determination unit determines the main subject based on the information about the human detected by the detection unit.

4. The information processing apparatus according to claim 1, further comprising a second detection unit configured to detect that a second gesture is made, the second gesture being a gesture of bending a finger in a direction to the human detected by the detection unit or a gesture of pointing a finger in the direction to the human, wherein in a case where the second gesture is detected, the determination unit determines the main subject based on the information about the human detected by the detection unit.

5. The information processing apparatus according to claim 1, further comprising a third detection unit configured to detect that a third gesture is made, wherein in a case where the third gesture is detected, the determination unit changes the main subject.

6. The information processing apparatus according to claim 5, wherein the third gesture is a gesture of pointing a plurality of fingers in the direction to the human detected by the detection unit or a gesture of waving a hand.

7. The information processing apparatus according to claim 1, further comprising a sound detection unit configured to detect a specific sound, wherein in a case where the sound detection unit detects the specific sound, the determination unit determines the main subject based on the information about the human detected by the detection unit.

8. The information processing apparatus according to claim 1, further comprising a sound detection unit configured to detect a specific sound from a moving image distribution destination, wherein the specific sound indicates that the main subject is to be determined as a human or that determining the main subject as an object is to be ended.

9. The information processing apparatus according to claim 1, further comprising an estimation unit configured to estimate the main subject, wherein, when no subject is present in a direction of the first gesture, in a case where the subject estimated by the estimation unit is present in an image, the determination unit sets the estimated subject as the main subject, and in a case where the subject is not present in the image, the determination unit determines the main subject based on the information about the human detected by the detection unit.

10. The information processing apparatus according to claim 1, wherein the detection unit detects at least any of a human body, a face, a pupil, a head, and a trunk.

11. The information processing apparatus according to claim 1, further comprising a control unit configured to perform control to execute a specific function based on the main subject determined by the determination unit.

12. The information processing apparatus according to claim 11, wherein the specific function is at least one of automatic focusing, automatic white balance, automatic exposure, and tracking.

13. The information processing apparatus according to claim 1, wherein the first gesture is detected from an image obtained by an imaging unit.

14. The information processing apparatus according to claim 4, wherein the second gesture is detected from an image obtained by an imaging unit.

15. The information processing apparatus according to claim 5, wherein the third gesture is detected from an image obtained by an imaging unit.

16. A control method for an information processing apparatus, the control method comprising:

detecting information about a human;

detecting that a first gesture is made, the first gesture indicating at least any of a direction in which an object is present, a position at which the object is present, and an area in which the object is present;

acquiring information about the object in response to detection of the first gesture; and determining a main subject in accordance with a result of acquisition of the information about the object in the acquiring or a result of detection of the information about the human in the detecting, wherein in a case where the first gesture is not detected determine the main subject based on the information about the human detected.

17. A computer-readable storage medium storing a program for causing a computer to execute steps of the control method according to claim 16.

* * * * *